United States Patent
Bauman et al.

(10) Patent No.: US 11,409,664 B2
(45) Date of Patent: Aug. 9, 2022

(54) LOGICAL MEMORY ALLOCATION AND PROVISIONING USING TIMESTAMPS

(71) Applicant: International Business Machines Corporation, Armonk, NY (US)

(72) Inventors: Scott Alan Bauman, Rochester, MN (US); Daniel Frank Moertl, Rochester, MN (US); Robert Edward Galbraith, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 217 days.

(21) Appl. No.: 16/870,363

(22) Filed: May 8, 2020

(65) Prior Publication Data

US 2021/0349833 A1    Nov. 11, 2021

(51) Int. Cl.
| | |
|---|---|
| *G06F 12/1045* | (2016.01) |
| *G06F 12/02* | (2006.01) |
| *G06F 16/17* | (2019.01) |
| *G06F 16/16* | (2019.01) |
| *G06F 9/50* | (2006.01) |

(52) U.S. Cl.
CPC ........ *G06F 12/1063* (2013.01); *G06F 9/5016* (2013.01); *G06F 12/0246* (2013.01); *G06F 16/164* (2019.01); *G06F 16/1734* (2019.01); *G06F 2212/7201* (2013.01)

(58) Field of Classification Search
CPC ............. G06F 12/0246; G06F 12/1063; G06F 2212/7201; G06F 9/5016; G06F 16/164; G06F 16/1734

USPC .......................................................... 711/154
See application file for complete search history.

(56) References Cited

U.S. PATENT DOCUMENTS

| | | | |
|---|---|---|---|
| 8,166,264 B2* | 4/2012 | Otani .................... | G06F 3/0605 711/170 |
| 9,460,009 B1 | 10/2016 | Taylor et al. | |
| 9,740,700 B1* | 8/2017 | Chopra ................. | G06F 16/128 |
| 9,830,098 B1* | 11/2017 | Lin ........................ | G11C 16/10 |
| 2006/0277383 A1* | 12/2006 | Hayden .................. | H04L 69/14 711/170 |
| 2015/0006846 A1* | 1/2015 | Youngworth .......... | G06F 3/0689 711/216 |
| 2016/0147449 A1* | 5/2016 | Andrei ................ | G06F 16/2308 707/814 |
| 2017/0315742 A1 | 11/2017 | Christiansen et al. | |

(Continued)

FOREIGN PATENT DOCUMENTS

WO    WO-2009134934 A2 *   11/2009   ......... G06F 12/1458

*Primary Examiner* — Reginald G Bragdon
*Assistant Examiner* — Aaron D Ho
(74) *Attorney, Agent, or Firm* — Scully, Scott, Murphy & Presser, P.C.

(57) ABSTRACT

A method and system of managing memory, the method including receiving a request for storage space in the memory system; obtaining a timestamp for a new Logical Unit Number (LUN); allocating a range of logical blocks to the new LUN in accordance with its requested size, the range of logical blocks including a starting logical block and a number of blocks; assigning the timestamp to the new LUN as the LUN creation timestamp; and saving the LUN creation timestamp with other metadata identifying the new LUN and the allocated logical blocks. Methods and system for deleting LUNs and using a deletion timestamp are disclosed as is a process to format a LUN.

20 Claims, 6 Drawing Sheets

(56) References Cited

U.S. PATENT DOCUMENTS

| | | |
|---|---|---|
| 2018/0032337 A1 | 2/2018 | Coneski et al. |
| 2018/0189155 A1 | 7/2018 | Kumar et al. |
| 2019/0108888 A1* | 4/2019 | Sarkar ................... G06N 5/04 |
| 2021/0133117 A1* | 5/2021 | Shabi ................. G06F 12/1009 |
| 2021/0271659 A1* | 9/2021 | Narasingarayanapeta ................. G06F 16/128 |

* cited by examiner

LOGICAL MEMORY ALLOCATION AND PROVISIONING USING TIMESTAMPS

BACKGROUND

The disclosure herein relates generally to memory management, including memory provisioning, including logical memory management and logical unit number (LUN) allocation, formatting and deletions, and management for memory systems including storage class memory (SCM).

Storage class memory (SCM) is a type of persistent memory that combines the low latency and byte-addressability of dynamic read access memory (DRAM) with the non-volatility, areal density, and economical characteristics of traditional storage media. Furthermore, given the byte-addressability and low latency of SCM technologies, central processing units (CPU) can access data stored in SCM without buffering the data in DRAM. Consequently, SCM technology blurs the distinction between computer memory and traditional storage media, and can enable single level architectures without the use of DRAM for storing data, although DRAM technology may be utilized.

Typically, SCM is implemented as groups of solid state devices connected to a computing system via several input/output (I/O) adapters, which are used to map technology of an I/O device to the memory bus of the central processing unit(s). However, writing data to SCM requires paying attention to specifics in the SCM technology. In an example an SCM media card is organized as a collection of packages that each include "N" number of dies with millions of memory elements that are byte-addressable. The new storage media with its byte addressability and the manner of addressing and accessing the new storage media would benefit from new ways of managing and controlling memory, including the provisioning, deleting and formatting of memory.

SUMMARY

The summary of the disclosure is given to aid understanding of a computer system, computer architectural structure, processor, memory systems including storage class memory (SCM), memory management and provisioning, and not with an intent to limit the disclosure or the invention. The present disclosure is directed to a person of ordinary skill in the art. It should be understood that various aspects and features of the disclosure may advantageously be used separately in some instances, or in combination with other aspects and features of the disclosure in other instances. Accordingly, variations and modifications may be made to the computer system, the computer's architectural structure, processor, memory systems, memory management and provisioning, and their architectural structure and method of operation to achieve different effects.

In one or more embodiments, methods, techniques, and/or systems for managing, including creating, deleting, and formatting, memory space as Logical Unit Numbers (LUNs) is disclosed. In an embodiment, a method of managing memory in a memory system is disclosed, where the method includes: receiving a request for storage space in the memory system; obtaining a timestamp for a new Logical Unit Number (LUN); allocating a range of logical blocks to the new LUN in accordance with its requested size, the range of logical blocks including a starting logical block and a number of blocks; assigning the LUN timestamp to the new LUN as a LUN creation timestamp (for example in a LUN creation field); and saving the LUN creation timestamp with other metadata identifying the new LUN and the allocated logical blocks. Preferably the range of logical blocks allocated to the new LUN are contiguous. The new LUN configuration data including the new LUN creation timestamp data in an aspect is saved in non-volatile memory in the memory system, and further saved in volatile hardware conversion tables. The memory system in one or more embodiments includes storage class memory having a plurality of storage chips having a plurality of dies having a plurality of non-volatile memory cells. The method in an aspect further includes associating in a logical to virtual translation table the assigned range of logical blocks to a corresponding set of virtual blocks in virtual memory; and associating the corresponding set of virtual blocks to corresponding physical storage space in the memory system.

The method in one or more aspects further includes performing a LUN deletion operation that comprises: setting the range of logical blocks to zero for a LUN to be deleted; obtaining a LUN timestamp for the LUN to be deleted; assigning the LUN timestamp to the LUN to be deleted; and saving the LUN timestamp for the LUN to be deleted, preferably in a LUN deletion timestamp field. The LUN configuration data for the LUN to be deleted, including the timestamp data for the LUN being deleted, is saved in non-volatile memory in the memory system, and in an aspect further saved in volatile configuration data tables. The method in an embodiment further includes performing a trim process to remove active virtual blocks from use and placing them on a free list. In an aspect, the method further includes performing a logical to virtual translation table rebuild process, and during the rebuild process, comparing a metadata timestamp saved with data when the data is written in memory with at least one of the group, and preferably all of the group, consisting of the LUN creation timestamp, the LUN deletion timestamp, and both the LUN creation timestamp and the LUN deletion timestamp to determine which data blocks are valid for the LUN, where the LUN creation and deletion timestamps in an aspect are saved in data configuration tables.

The method in one or more embodiments further includes performing a LUN formatting operation that comprises: updating the state of a LUN to be formatted to indicate that the LUN is undergoing a formatting operation; obtaining a new timestamp for the LUN to be formatted; assigning the new timestamp as the creation timestamp associated with the LUN to be formatted; saving the new timestamp as the creation timestamp for the formatted LUN; and updating the state of the LUN being formatted to indicate that the LUN is ready to receive input/output. The method in an aspect further includes performing a trim process to remove active virtual blocks from use and placing them on a free list. The LUN configuration data for the LUN that is formatted in an embodiment, including the LUN creation timestamp data, is saved in a configuration data table in the memory system, and further saved in hardware conversion tables.

A memory system is also disclosed that in one or more embodiments includes: a memory controller for managing memory storage; a memory module having a plurality of packages, each package having a plurality of dies, each die containing a plurality of non-volatile memory cells; and a computer-readable storage medium comprising program instructions that when executed in response to a request for storage space in the memory system cause the system to: obtain a timestamp for a new Logical Unit Number (LUN); allocate a range of logical blocks to the new LUN in accordance with its requested size, the range of logical blocks including a starting logical block and a number of blocks; assign the LUN timestamp to the new LUN; and save the LUN timestamp preferably as a creation timestamp with other metadata identifying the new LUN and the allocated logical blocks. The system in an aspect further includes program instructions that when executed in response to a request to delete a LUN in the memory system cause the system to: set the range of logical blocks to zero for a LUN to be deleted; obtain a timestamp for the LUN to be deleted; assign the timestamp to the LUN to be deleted; and save the timestamp for the LUN to be deleted preferably as a deletion timestamp. The system further includes in an aspect program instructions that when executed in response to a request to format memory cause the system to: update the state of a LUN to be formatted to indicate that the LUN is undergoing a formatting operation; obtain a new timestamp for the LUN to be formatted; assign the new timestamp as the creation timestamp associated with the LUN to be formatted; save the new timestamp as the creation timestamp for the formatted LUN; and update the state of the LUN being formatted to indicate that the LUN is ready to receive input/output.

The foregoing and other objects, features and advantages of the invention will be apparent from the following more particular descriptions of exemplary embodiments of the invention as illustrated in the accompanying drawings wherein like reference numbers generally represent like parts of illustrative embodiments of the invention.

BRIEF DESCRIPTION OF THE DRAWINGS

The various aspects, features and embodiments of a computer system, computer architectural structure, processor, memory system, memory management and provisioning, and their method of operation will be better understood when read in conjunction with the figures provided. Embodiments are provided in the figures for the purpose of illustrating aspects, features, and/or various embodiments of the computer system, computer architectural structure, processors, memory systems including SCM, memory management and provisioning, and their method of operation, but the claims should not be limited to the precise arrangement, structures, features, aspects, assemblies, subassemblies, systems, circuitry, embodiments, methods, processes, techniques, and/or devices shown, and the arrangements, structures, systems, assemblies, subassemblies, features, aspects, methods, processes, techniques, circuitry, embodiments, and devices shown may be used singularly or in combination with other arrangements, structures, assemblies, subassemblies, systems, features, aspects, circuitry, embodiments, methods, techniques, processes, and/or devices.

DETAILED DESCRIPTION

Figure 1:
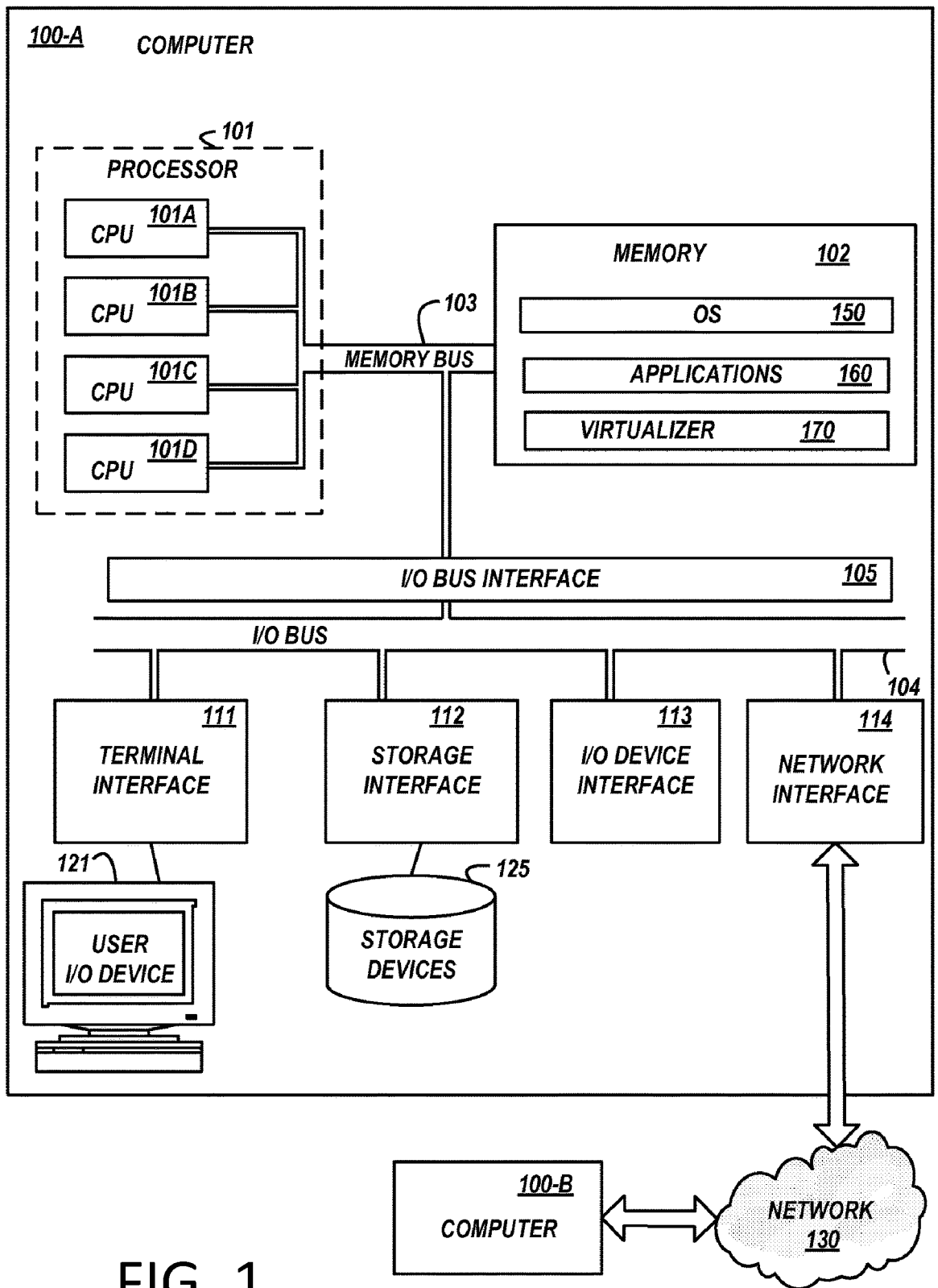
FIG. 1 is a functional block diagram illustrating a computer system, according to embodiments of the present disclosure.

The following description is made for illustrating the general principles of the invention and is not meant to limit the inventive concepts claimed herein. In the following detailed description, numerous details are set forth in order to provide an understanding of the computer system, computer architectural structure, processor, memory systems, memory management, and their architectural structures and methods of operation, however, it will be understood by those skilled in the art that different and numerous embodiments of the computer system, computer architectural structure, processor, memory systems and their architectural structures, and methods of operation may be practiced without those specific details, and the claims and disclosure should not be limited to the arrangements, structures, systems, assemblies, subassemblies, circuitry, features, aspects, processes, methods, techniques, embodiments, and/or details specifically described and shown herein. Further, particular features, aspects, arrangements, structures, systems, assemblies, subassemblies, circuitry, embodiments, processes, methods, techniques, etc. described herein can be used in combination with other described features, aspects, arrangements, structures, systems, assemblies, subassemblies, circuitry, embodiments, processes, methods, techniques, etc. in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc. It must also be noted that, as used in the specification and the appended claims, the singular forms "a," "an" and "the" include plural referents unless otherwise specified, and that the terms "comprises" and/or "comprising," when used in this specification and claims, specify the presence of stated features, integers, aspects, arrangements, embodiments, structures, systems, assemblies, subassemblies, circuitry, steps, operations, elements, and/or components, but do not preclude the presence or addition of one or more other features, integers, aspects, arrangements, embodiments, structures, systems, assemblies, subassemblies, circuitry, steps, operations, elements, components, and/or groups thereof.

The following discussion omits or only briefly describes conventional features of information processing and/or handling systems, including processors, microprocessor systems, memory systems, and their architectures, as well as memory management and address translation techniques and systems, which should be apparent to those skilled in the art. It is assumed that those skilled in the art are familiar with the general architecture of computer and/or information handling systems, processors, memory systems, and in particular with memory management techniques and systems, and their operations. It may be noted that a numbered element is numbered according to the figure in which the element is introduced, and is typically referred to by that number throughout succeeding figures.

The present disclosure is directed at memory storage systems and memory management, and in one or more embodiments, managing memory (storage) including provisioning, allocating, formatting, and deleting logical unit numbers (LUNs), including the use of time stamps to facilitate memory management. A LUN is a unique identifier for designating an individual or collection of physical or virtual memory/storage devices. In one or more embodiments, a host, e.g., a computer, requests memory space to write data and the host performs an operation to allocate memory, e.g., a range of storage blocks, to a LUN. In one or more aspects, timestamps are stored when creating and/or deleting a LUN and can be used to manage the memory/storage of the computer. In one or more embodiments, the timestamps, e.g., a creation timestamp and/or a deletion timestamp, are saved preferably in a hardware LUN configuration data (CD) table in non-volatile memory, and in an aspect in control store (CS) memory (e.g., volatile memory). In an aspect, a timestamp can be saved in the LUN configuration data (CD) table in a timestamp creation field as appropriate, and/or a timestamp can be saved in the LUN CD table in a timestamp deletion field as appropriate. The creation and deletion timestamps can be used to more effectively and efficiently manage memory. For example, during conversion table rebuild processes, comparison of the metadata timestamp associated with the data saved in memory with the creation and/or deletion timestamp stored for the LUN in the LUN CD table can be advantageously used to determine which data blocks are valid for the LUN. The LUN creation and deletion timestamps can also be used in conjunction with a hardware trim request to free and mark virtual memory available for use, e.g., put it on a free list available for use. Formatting operations, in one or more embodiments, can update the LUN creation timestamp, which is used in managing and controlling memory.

FIG. 1 depicts a high-level block diagram representation of a computer 100-A connected to another computer 100-B via a network 130, according to an embodiment of the present invention. The term "computer" is used herein for convenience only, and in various embodiments is a more general data handling system, such as a mobile phone, tablet, server computer, etc. The mechanisms and apparatus of embodiments of the present invention apply equally to any appropriate data or information handling system.

The major components of the computer 100 may comprise one or more processors 101, a main memory system 102, a terminal interface 111, a storage interface 112, an I/O (Input/Output) device interface 113, and a network adapter or interface 114, all of which are communicatively coupled, directly or indirectly, for inter-component communication via a memory bus 103, an I/O bus 104, and an I/O bus interface unit 105. The computer 100 contains one or more general-purpose programmable central processing units (CPUs) 101A, 101B, 101C, and 101D, herein generically referred to as the processor 101. In an embodiment, the computer 100 contains multiple processors typical of a relatively large system; however, in another embodiment the computer 100 may alternatively be a single CPU system. Each processor 101 executes instructions stored in the main memory system 102 and may comprise one or more levels of on-board cache.

In an embodiment, the main memory system 102 may comprise a random-access semiconductor memory (e.g., a DRAM, an SCM, or both), storage device, or storage medium for storing or encoding data and programs. In another embodiment, the main memory system 102 represents the entire virtual memory of the computer 100, and may also include the virtual memory of other computer systems coupled to the computer 100 or connected via the network 130. The main memory system 102 is conceptually a single monolithic entity, but in other embodiments the main memory system 102 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The main memory system 102 stores or encodes an operating system (OS) 150, an application 160, and/or other program instructions. Although the operating system (OS) 150, application 160, etc. are illustrated as being contained within the main memory system 102 in the computer 100, in other embodiments some or all of them may be on different computer systems and may be accessed remotely, e.g., via the network 130. The computer 100 may use virtual addressing mechanisms that allow the programs of the computer 100 to behave as if they only have access to a large, single storage entity instead of access to multiple, smaller storage entities. Thus, while operating system 150, application 160, or other program instructions are illustrated as being contained within the main memory system 102, these elements are not necessarily all completely contained in the same storage device at the same time. Further, although operating system 150, application 160, other program instructions, etc. are illustrated as being separate entities, in other embodiments some of them, portions of some of them, or all of them may be packaged together.

In an embodiment, operating system 150, application 160, and/or other program instructions comprise instructions or statements that execute on the processor 101 or instructions or statements that are interpreted by instructions or statements that execute on the processor 101, to carry out the functions as further described below. When such program instructions are able to be run by the processor 101, such computer 100 becomes a particular machine configured to carry out such instructions. For example, instructions for a memory mirroring application 160A may be loaded upon one or more computers 100A that causes the computer 100A to mirror the main memory system 102 into a first portion and into a redundant second portion. In another example, main memory system 102 may be mirrored by operating system 150. In another example, main memory system 102 may be mirrored by a virtualizer application 170, such as a hypervisor.

One or more processors 101 may function as a general-purpose programmable graphics processor unit (GPU) that builds images (e.g. a GUI) for output to a display. The GPU, working in conjunction with one or more applications 160, determines how to manipulate pixels on, for example, a display, touch screen, etc. to create a display image or user interface. Ultimately, the image (e.g. GUI, etc.) is displayed to a user. The processor 101 and GPU may be discrete components or may be integrated into a single component.

The memory bus 103 provides a data communication path for transferring data among the processor 101, the main memory system 102, and the I/O bus interface unit 105. The I/O bus interface unit 105 is further coupled to the system I/O bus 104 for transferring data to and from the various I/O units. The I/O bus interface unit 105 communicates with multiple I/O interface units 111, 112, 113, and 114, which are also known as I/O processors (IOPs) or I/O adapters (IOAs), through the system I/O bus 104. The I/O interface units support communication with a variety of storage and I/O devices. For example, the terminal interface unit 111 supports the attachment of one or more user I/O devices 121, which may comprise user output devices (such as a video display device, speaker, and/or television set) and user input devices (such as a keyboard, mouse, keypad, touchpad, trackball, buttons, light pen, or other pointing device). A user may manipulate the user input devices using a user interface, in order to provide input data and commands to the user I/O device 121 and the computer 100, and may receive output data via the user output devices. For example, a user interface may be presented via the user I/O device 121, such as displayed on a display device, played via a speaker, or printed via a printer. The user interface may be a user interface that provides content to a user visually (e.g. via a screen), audibly (e.g. via a speaker), and/or via touch (e.g. vibrations, etc.). In some embodiments, the computer 100 itself acts as the user interface as the user may move the computer 100 in ways to interact with, input, or manipulate computer application 160 data, function, etc.

The storage interface unit 112 supports the attachment of one or more local disk drives or secondary storage devices 125. In an embodiment, the secondary storage devices 125 are rotating magnetic disk drive storage devices, but in other embodiments they are arrays of disk drives configured to appear as a single large storage device to a host computer, or any other type of storage device. The contents of the main memory system 102, or any portion thereof, may be stored to and retrieved from the secondary storage devices 125, as needed. The local secondary storage devices 125 typically have a slower access time than does the main memory system 102, meaning that the time needed to read and/or write data from/to the main memory system 102 is less than the time needed to read and/or write data from/to the local secondary storage devices 125.

The I/O device interface 113 provides an interface to any of various other input/output devices, such as printers or fax machines. The network adapter 114 provides one or more communications paths from the computer 100 to other data handling devices such as numerous other computers; such paths may comprise, e.g., one or more networks 130. Although the memory bus 103 is shown in FIG. 1 as a relatively simple, single bus structure providing a direct communication path among the processors 101, the main memory system 102, and the I/O bus interface 105, in fact the memory bus 103 may comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 105 and the I/O bus 104 are shown as single respective units, the computer 100 may, in fact, contain multiple I/O bus interface units 105 and/or multiple I/O buses 104. While multiple I/O interface units are shown, which separate the system I/O bus 104 from various communications paths running to the various I/O devices, in other embodiments some or all of the I/O devices are connected directly to one or more system I/O buses.

I/O interface 113 may contain electronic components and logic to adapt or convert data of one protocol on I/O bus 104 to another protocol on another bus. Therefore, I/O interface 113 may connect a wide variety of devices to computer 100 and to each other such as, but not limited to, tape drives, optical drives, printers, disk controllers, other bus adapters, PCI adapters, workstations using one or more protocols including, but not limited to, Token Ring, Gigabyte Ethernet, Ethernet, Fibre Channel, SSA, Fiber Channel Arbitrated Loop (FCAL), small system computer interface (SCSI), Serial SCSI, Ultra3 SCSI, Infiniband, FDDI, ATM, 1394, ESCON, wireless relays, Twinax, LAN connections, WAN connections, high performance graphics, etc. Though shown as distinct entities, the multiple I/O interface units 111, 112, 113, and 114 or the functionality of the I/O interface units 111, 112, 113, and 114 may be integrated into a similar device.

In various embodiments, the computer 100 is a multi-user mainframe computer system, a single-user system, a server computer, storage system, or similar device that has little or no direct user interface, but receives requests from other computer systems (clients). In other embodiments, the computer 100 is implemented as a desktop computer, portable computer, laptop or notebook computer, tablet computer, pocket computer, telephone, smart phone, pager, automobile, teleconferencing system, appliance, or any other appropriate type of electronic device.

The network 130 may be any suitable network or combination of networks and may support any appropriate protocol suitable for communication of data and/or code to/from the computer 100A and at least the computer 100B. In various embodiments, the network 130 may represent a data handling device or a combination of data handling devices, either connected directly or indirectly to the computer 100. In another embodiment, the network 130 may support wireless communications. Alternatively and/or additionally, the network 130 may support hard-wired communications, such as a telephone line or cable. In an embodiment, the network 130 may be the Internet and may support IP (Internet Protocol). In an embodiment, the network 130 is implemented as a local area network (LAN) or a wide area network (WAN). In an embodiment, the network 130 is implemented as a hotspot service provider network. In another embodiment, the network 130 is implemented on an intranet. In an embodiment, the network 130 is implemented as any appropriate cellular data network, cell-based radio network technology, or wireless network. In an embodiment, the network 130 is implemented as any suitable network or combination of networks. Although one network 130 is shown, in other embodiments any number of networks (of the same or different types) may be present.

FIG. 1 is intended to depict the representative major components of the computer 100. But, individual components may have greater complexity than represented in FIG. 1, components other than or in addition to those shown in FIG. 1 may be present, and the number, type, and configuration of such components may vary. Several particular examples of such additional complexity or additional variations are disclosed herein; these are by way of example only and are not necessarily the only such variations. The various program instructions implementing, for example, upon computer system 100 according to various embodiments of the invention may be implemented in a number of manners, including using various computer applications, routines, components, programs, objects, modules, data structures, etc.

Figure 2:
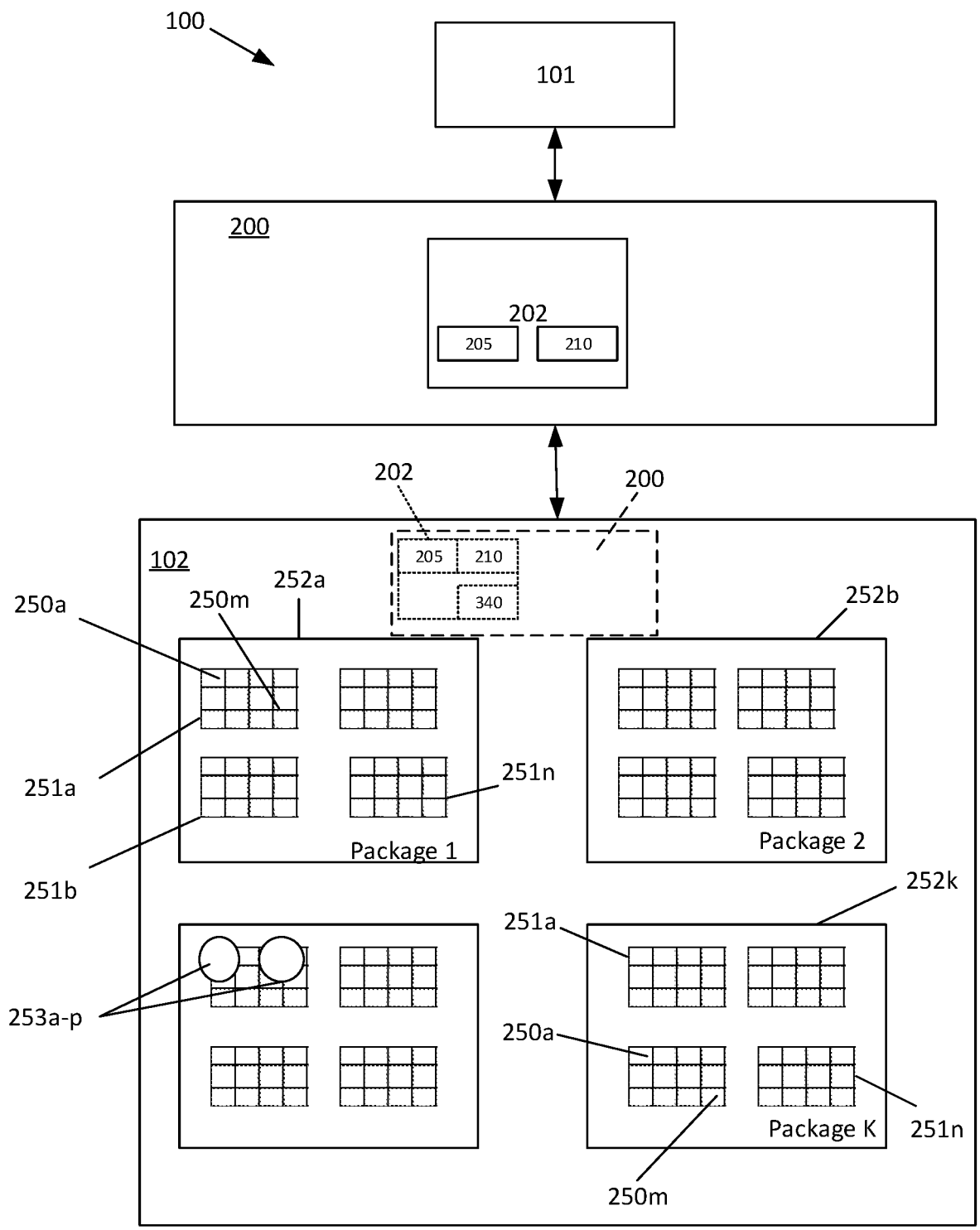
FIG. 2 is a functional block diagram illustrating an example memory system and controller, according to embodiments of the present disclosure.

Referring now to FIG. 2, a schematic block diagram of an example main memory system 102 in communication with the processor 101 via a memory controller 200 is illustrated. As shown in FIG. 2, memory module(s) or card(s) 102 (e.g., an SCM media card) are configured to store data in a plurality "K" of packages, (i.e., chips) 252a-k (e.g., K=24), and each package includes a plurality "N" dies 251a-n (e.g., N=16). Each package in an embodiment can include the same number "N" of dies (e.g., N=8, 16, etc.). Each of dies 251a-n includes a number "M" of memory cells, in particular memory cells 250a-m. A number of the memory cells 250 in each die may be grouped into a number "X" of media replacement unit (MRU) groups 253a-p, each die in an embodiment can include a fixed number of MRUs groups 253. For example, there could be 16 (X=16) MRU groups in a die 251.

As illustrated in FIG. 2, controller 200 can include an address translation module 202. Module 202 may be implemented in software, firmware, hardware, or a combination of two or more of software, firmware, and hardware. The address translation module 202 may associate logical addresses and/or virtual addresses used by processor(s) (Host) 101 with a physical block address (PBA) on memory module/card 102. For example, in response to address translation module 202 receiving a memory access request from a processor as part of a read or write command, address translation module 202 may look-up the logical address in a logical address conversion table 205 and thereafter lookup a virtual address from the logical address via a virtual address table 210 and use the virtual address to determine a physical address on memory module (card) 102 that corresponds with the received logical address. In some examples, address translation module 202 may use a tiered virtual-to-physical (V2P) table structure for performing the translation from the VBA to the PBA. In other examples, controller 200 may include additional modules or hardware units, or may include fewer modules or hardware units. Controller 200 may include a microprocessor, digital signal processor (DSP), application specific integrated circuit (ASIC), field programmable gate array (FPGA), or other digital logic circuitry. While FIG. 2 illustrates the memory controller 200 as being located outside the memory module/card 102, the disclosure is not so limiting, and the memory controller 200 may be a part of the memory module/card 102, or could be on the host/processor side, e.g., on processor 101.

Figure 3:
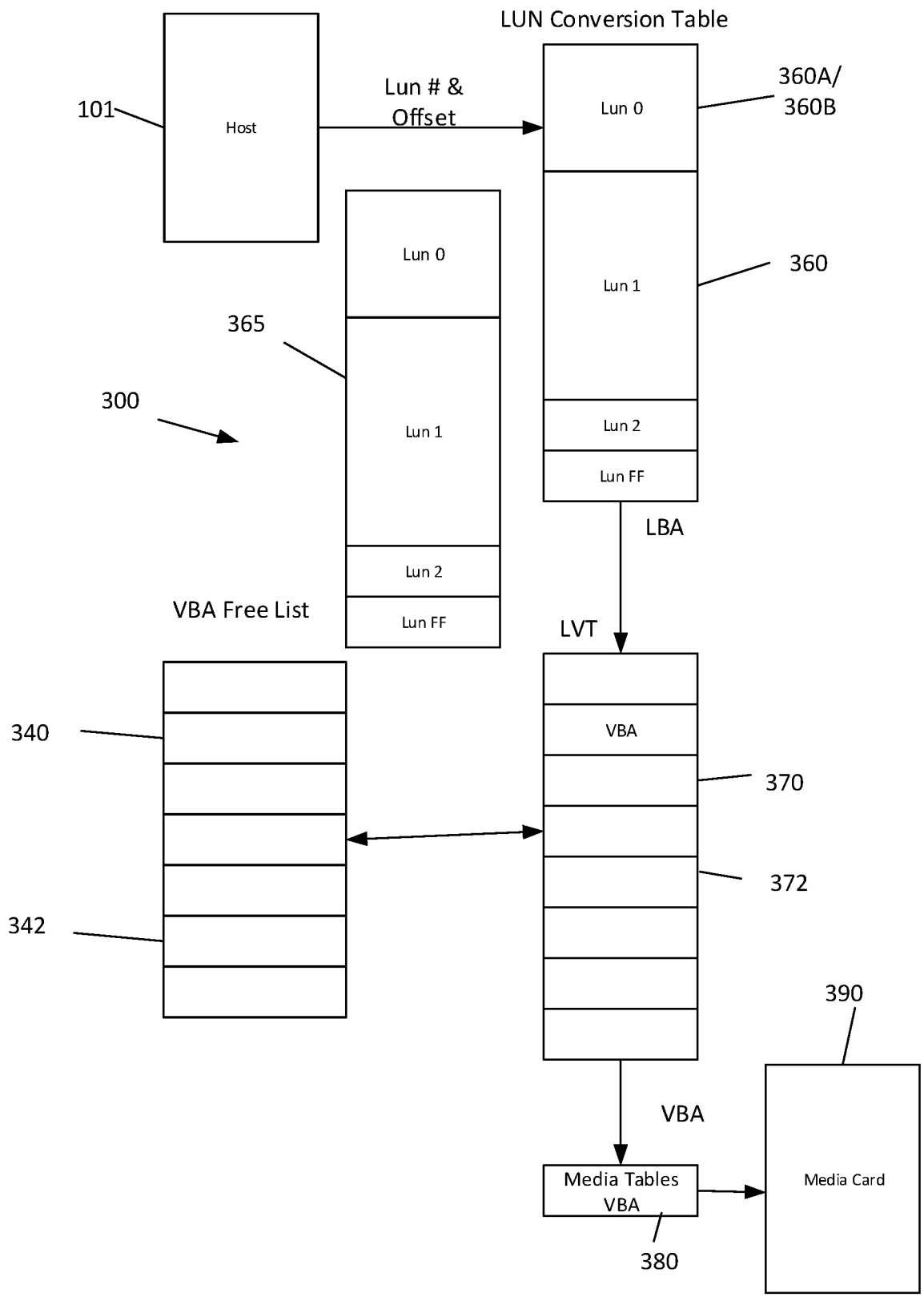
FIG. 3 illustrates a block diagram of an embodiment of the hardware and process of translating a logical address to a physical address in a memory system.

Referring now to FIG. 3, a block diagram overview 300 of an embodiment of an information handling system, including a memory system, used for managing memory including provisioning (e.g., allocating, formatting, and/or deleting) one or more LUNs is shown. FIG. 3 diagrammatically illustrates tables for translating an address used by the host (host address) to a virtual address (logical to virtual (L2V) translation), and translation of the virtual address into a real or physical address (virtual to physical (V2P) translation) on the media card (memory module) 390.

The Host 101 in one or more embodiments addresses memory/media card 390 via a Logical Unit Number (LUN) and a logical unit number offset (LUN offset). The system will allocate a range of Logical Block Addresses (LBAs) for host usage, e.g., use by the processor. A conversion table (LUN conversion table) 360 typically used for LUN to LBA translation maintains the mapping of the LUNs and LUN offsets into a range of one or more Logical Block Addresses (LBAs), typically a starting LBA and a number of LBAs. The LUN conversion Table 360 in one or more embodiments includes a starting LBA, the length (number of LBAs), creation timestamp, and flags for state tracking. The size of the LBA is typically constant, and in an embodiment, there is a LBA for each 4 KB block of memory the Host 101 can access. The LUN conversion Table 360 can be used for translating a LUN (and LUN length/offset) into one or more LBAs when the Host requests a memory access. A LUN (and LUN length/offset) is fed into LUN conversion Table 360 where if there is a matching LUN (and LUN offset) in the LUN conversion Table 360, the range of LBAs is provided. The LUN conversion Table 360 has multiple entries and in an embodiment is located in hardware registers. There may be multiple copies of the LUN conversion table 360 (e.g., 360A and 360B) stored in appropriate hardware registers.

The LUN conversion Table 360 can be located in the memory controller 200, on the media card 390, and/or in the memory controller 200 on the media card 102/390. The LUN conversion Table 360 (e.g., 205) preferably resides in the address translation module 202 in the memory controller 200 on the media card 102. A similar version of the LUN conversion Table 360 can also be located in local memory available to the host/processor 101.

In the example of FIG. 3, after the LUN/offset/length is converted into a range of one or more LBAs by the LUN conversion Table 360, the LBAs are fed into a Logical to Virtual (L2V) Translation (L2VT) Table 370 that converts or translates each LBA into a virtual entry or address, for example, a Virtual Block Address or VBA. The VBA is fed into media tables 380 where the virtual address, e.g., VBA, is translated into a physical or real address on media card 390. The L2VT Table 370 in one or more embodiments is arranged as a table structure and has multiple entries 372. In an embodiment, each entry 372 in the L2VT Table 370 includes the Virtual Block Address (VBA). For each LBA there is a one-to-one mapping to a VBA (assuming the LBA is not trimmed). Other metadata can be included in the L2VT Table 370. The L2VT Table 370 in an embodiment is stored in DRAM, and in an aspect the field size of each entry is small, for example, 8-bytes per entry. The L2VT Table 370 can be located in the memory controller 200, on the media card 102/390, and/or in the memory controller 200 on the media card 102/390. The L2VT Table 370 (e.g., 210 in FIG. 2) preferably resides in the address translation module 202 in the memory controller 200 on the media card 102/390.

FIG. 3 also shows VBA Free List 340. VBAs that are not actively storing data for an associated LBA are kept on the VBA Free list 340. VBA Free List 340 has a number of entries 342. When a write command requires a free VBA to store data, a free VBA is obtained from the VBA Free List 340. The VBA free list 340 can be located in the memory controller 200, on the media card 102/390, and/or in the memory controller 200 on the media card 102/390. The VBA Free List 340 preferably resides in the address translation module 202 in the memory controller 200 on the media card 102/390.

FIG. 3 also shows hardware LUN configuration data (CD) table 365 used for configuration management, including managing the flows of creating/deleting/formatting LUNs. The LUN CD table 365 includes the starting LBA, the length (number of LBAs), the creation timestamp, the deletion timestamp, the serial number/world-wide unique Identifier, and other configuration data and attributes. The LUN CD table 365 contains the master set of LUN data from which the LUN conversion Table(s) 360 is updated. The LUN CD table 365 is stored in control store memory for normal usage, and a copy is saved in non-volatile memory for saving across power cycles. The LUN CD table 365 is used by firmware running in the controller (in the main processor core). The LUN CD table 365, is similar to LUN conversion Table 360 and in an example have much the same purpose, with some slight differences in entry data relevant to usage. For example, the LUN conversion Table 360 is used by hardware, so its entries have some state/validity flags defined, while the LUN CD table 365 is used primarily by configuration management, and thus has some fields that are not relevant to hardware usage.

Some of the major operations of information handling systems, including the example information handling system 100 of FIG. 2 and example information handling system 300 of FIG. 3 include creating a LUN, deleting a LUN, and formatting a LUN. Creating a LUN includes allocating a range of LBAs for host usage. One or more LUNs are deleted when a range of LBAs is removed from host control. Formatting a LUN involves initializing the LBAs assigned to a LUN to a known state, e.g., (setting to zero).

In one or more embodiments, a creation timestamp and a deletion timestamp is associated with the LUN and saved. In an aspect, in addition to storing data identifying the LUN, e.g., the LUN identifier, the length (size of the LUN in blocks), the LUN offset, starting LBA, length of the LBA or number of LBAs, etc., a creation timestamp can be obtained when the LUN is created and stored to show when the LUN was last created, and a deletion timestamp can be obtained when the LUN is deleted and stored to show when the LUN was last deleted. The creation and deletion timestamps can be saved in LUN CD table 365 and saved in control store memory for normal usage, and a copy can be saved in non-volatile memory (e.g., SCM) for saving across power cycles. In one or more embodiments, the value of the creation timestamp can be set to zero if the LUN has never been created. Additionally, or alternatively, in one or more embodiments, the value of the deletion timestamp can be set to zero if the LUN has never been deleted. The system in an aspect can undergo a formatting procedure where the LUN creation timestamp can be reset. The use of the timestamps can be advantageously used for memory management to help control the use and validity of memory address spaces.

The Host, in one or more embodiments, performs a "create LUN" operation to allocate storage space, e.g., a range of storage blocks, to a Logical Unit Number (LUN) for subsequent access and addressing. The input from the Host for this request is typically the amount of space, e.g., the number of blocks (and in the illustrative example, the number of LBAs), to be allocated. In an embodiment, a range of LBAs (starting LBA plus number of LBAs) are assigned when a new LUN is created. The Host accesses the memory system by providing a LUN number and the block offset into that LUN, e.g., a logical unit number offset (LUN offset). The Host typically also provides the number of blocks to be accessed. In an aspect, while the Host will address blocks from LBA 0 to "Size-X", the internal LUN configuration, in an example, will retain an offset/length for translation by the logical to virtual (L2V) translation engine when handling read/write commands. The LUN CD table 365 contains the starting LBA and the LBA length or number of LBAs for each LUN. Thus, when the host provides a LUN number and offset/length, the corresponding range of LBAs for the request can be generated. The hardware tables associated with the LUN, e.g., LUN conversion Table 360, are updated with the offset/length values for translation, as are the state registers to enable read/write command handling.

The assignment of LBAs is typically performed by firmware executing within the memory controller (e.g., memory controller 200). This assignment of LBAs is maintained in the LUN CD table 365. In one or more embodiments, the LUN CD table 365 is analyzed to assign a range of continuous LBAs to the new LUN in accordance with the requested size. Configuration management in the memory controller determines and assigns the LBAs. More specifically, in an aspect, the number of LBAs supported by the system is typically known (defined), the number of LBAs assigned to existing LUNs is either known or can be determined, and the number of LBAs requested for the new LUN is known, so the range of LBAs to assign to the LUN can be determined, preferably by configuration management. This assignment of LBAs is maintained in the LUN CD table 365, with the data also saved and updated in hardware tables, e.g., LUN conversion table 360, preferably in DRAM to facilitate high-speed translation. In an example implementation, LUN CD table 365 is saved within the control store memory as well as in non-volatile memory for maintaining configuration across resets and power cycles. The high speed conversion tables, e.g., LUN conversion table 360, would be used by controller hardware when translating the host's read/write request into a LBA. Unique vital product data (VPD) is assigned to the new LUN and saved in LUN CD table 365, which can be retrieved in an embodiment by the host, preferably via the host API interface.

When allocating and/or assigning a block of LBAs to a LUN, in one or more embodiments, a creation timestamp associated with the LUN can be obtained and saved. In an aspect, when deleting one or more LUNs a deletion timestamp associated with the LUNs can be obtained and saved. In one or more embodiments, the creation and deletion timestamp data is saved in fields in LUN CD table 365 with the Host LUN configuration data. The creation and deletion timestamps and LUN configuration data in one or more aspects are stored in hardware configuration data tables, e.g., DRAM, for fast access and in an embodiment are stored in non-volatile memory. In one or more embodiments, when data is written in memory, timestamps are stored in metadata in non-volatile memory along with the actual data. The creation timestamp is set to indicate a reference point, which in an aspect can be used to indicate a reference point for the validity of the data blocks assigned to the LUN. That is, the creation timestamp can be used to determine the relevancy of the data assigned to those LBAs. For example, during a translation table rebuild process, e.g., LVT 370 rebuild process, comparison of the timestamp saved in metadata with the actual data when the data was written in main memory, with the creation/deletion timestamps saved in the LUN configuration data (CD) table 365 can be used to determine which data blocks (e.g., logical and/or virtual data blocks (VBAs)) are valid for the LUN.

Figure 4:
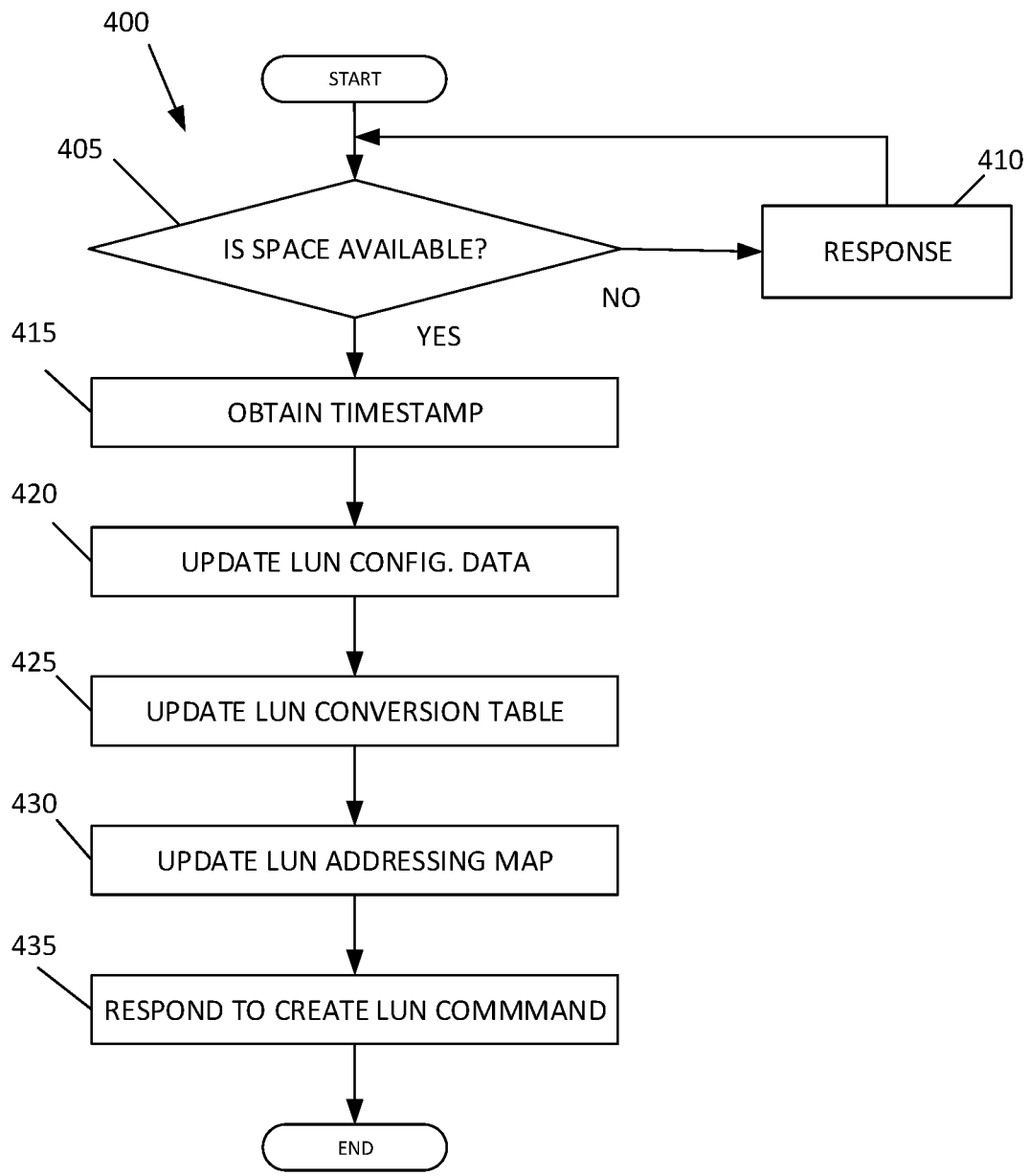
FIG. 4 is a flow chart of an embodiment of a method for allocating memory for host usage in, for example, the memory system of FIG. 2.

Referring now to FIG. 4, a flowchart illustrating an example method 400 of allocating LUNs in a memory system, e.g., creating a LUN and allocating a range of Logical Block Addresses (LBAs) for host usage, is disclosed. The flowcharts and block diagrams in the figures illustrate exemplary architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur in a different order than noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The process 400 of creating a LUN and assigning a block of LBAs includes a host accessing the memory system for memory space. In one or more aspects, the Host requests memory space, a number of blocks, e.g., LBAs, and a "Create LUN" operation is performed. At the start, both LUN conversion table entries, for example the entry in the table 360B used by hardware Log 2Vir engine and the entry in the table 360A used by hardware SISLite engine (Host API) are invalid from initialization or previous LUN deletion. In one or more embodiments, whether the memory system has any available space is checked at 405. In one or more embodiments, when a new LUN is requested, the LUN configuration data (CD) table 365 (i.e., the configuration of existing LUNs) is utilized to determine if sufficient LBAs are available for the request.

If there is no space available in memory (405: No), then the system in an embodiment can respond in a number of manners depending upon its design. In this regard, the host actions for the condition where there is insufficient space available will depend on the application being implemented on the Host level, and are not particularly pertinent to this disclosure. In one example, the system can wait until memory is available performing a loop as illustrated in FIG. 4. In another aspect, if no space is available in memory (405: No), then the system at 410 can propagate to a higher level function failure. If there is space available in memory (405: Yes), then the process 400 proceeds to 415 where a timestamp is obtained. In an embodiment, the timestamp is typically sourced from hardware and managed by firmware.

At 420 the LUN configuration data is updated in the LUN configuration data (CD) table 365. In an embodiment, a LBA range, e.g., a starting LBA and length or number of LBAs, is assigned to the LUN. Updating the LUN configuration will depend upon the design of the memory system, and in an embodiment the LUN configuration is updated locally in a shadow of the data stored in control store (CS) memory, which in an example of a particular implementation refers to a region of internal control store (CS) memory that is available to all processor cores (host) in a multi-core subsystem. Storing the data locally permits the data to be accessed by firmware with much less latency than the data stored persistently in main memory, e.g. SCM. Preferably, the LBA range assigned to the LUN will be continuous and fragmentation is minimized. The LBA range in an example is assigned or allocated by firmware executing within the controller, with the data saved persistently within the controller in non-volatile memory for maintaining the configuration across resets and power cycles. In an aspect, the vital product data (VPD) is assigned. The LUN creation timestamp can also be assigned and saved at 420. The creation timestamp, in one or more embodiments, is stored in main memory, e.g. non-volatile memory. In an aspect, the timestamp when assigning the LBA range is saved as the creation timestamp. In an embodiment, the LBA range (the starting LBA and number of LBAs), the VPD, and the creation timestamp are all saved and/or updated in the LUN CD table 365, which in an aspect is saved in control store memory on the processor core (host) 101 and a copy is also saved on the media card 390 preferably in non-volatile memory.

At 425, the LUN conversion table(s) is updated. In an example, the LUN to LBA conversion table, e.g., LUN conversion Table 360, is updated. In this regard, local translation conversion tables, conversion tables associated with the memory controller and/or main memory translation tables should be updated, as well as, any other table referencing the LUN/LBA (directly or indirectly). Local and global registers based upon the design of the system and as appropriate should be updated. In an embodiment, the starting LBA and maximum length is updated (stored) and included in the translation/conversion tables associated with the LUN and/or LBA. The creation timestamp in one or more embodiments is stored and associated with corresponding entries in the conversion tables. In an embodiment, the timestamp obtained when assigning the LBA range is saved in a creation timestamp field in the conversion tables, e.g., the LUN conversion Table 360. In an aspect, the entry in the LUN conversion table, e.g., LUN conversion Table 360, is marked or tagged ready for I/O.

Optionally, depending upon the system design, a LUN addressing map is updated at 430. The LUN address map is a basic table typically located in shared control store memory and used by secondary processor cores. The LUN address map is a basic table containing data for each supported LUN, including the starting LBA and the length or number of LBAs, and is used only when needed for translation/validation of LBAs. The LUN addressing map is populated/updated along with other tables during configuration management, but its usage is by the secondary cores in the processor. At 435 a Response to the create LUN command can optionally be sent to communicate completion of the request/command. In one or more embodiments, depending upon the design, a response to the create LUN command is sent to communicate completion of the request/command. While 420, 425, and 430 have been addressed in a particular order for the sake of convenience it can be appreciated that the order can be changed, and in implementations 420, 425 and 430 can occur simultaneously or nearly simultaneously. Moreover, while the method 400 refers to updating the LUN configuration data, the LUN to LBA conversion tables, and the LUN addressing map, it can be appreciated that one or more of those actions might be optional in light of the memory architecture and/or Host implementation.

One or more operations of information handling systems, including memory systems, or memory management, includes deleting a LUN and removing a range of LBAs from host control. To delete the LUN and remove it from Host control, in an embodiment, a trim process, preferably a trim command, and in an aspect a hardware trim command is invoked for the LUN offset/length, e.g., the LBA range, associated with the LUN. In an embodiment, the starting LBA and/or the length of the LBA (the number of LBAs) are set to zero for the LUN to be deleted. The starting LBA and/or size of the LUN (the number of LBAs) is set to zero for the LUN to be deleted and saved in the LUN configuration data (CD) table 365. The hardware state registers associated with the LUN are updated to manage read/write commands directed to the LUN being deleted. The hardware LUN conversion tables associated with the LUN, e.g., LUN conversion tables 360, preferably are updated to indicate that no LBAs are mapped for that entry, and in an aspect, the LUN offset and/or the LUN length are set to zero. In one or more embodiments, the deletion timestamp associated with the LUN is obtained and stored. The current timestamp in an embodiment is obtained at the time of the delete LUN request, and that timestamp is stored as the deletion timestamp. The timestamp in an embodiment is managed by firmware. The deletion timestamp in one or more embodiments is saved in the LUN configuration data (CD) table, e.g., LBA Table 365. Use of the trim command, e.g., the hardware trim command, will place appropriate VBAs on the VBA Free List 340, and in addition will mark L2VT table entries such that read operations directed at affected LBAs will return zeros until written.

Figure 5:
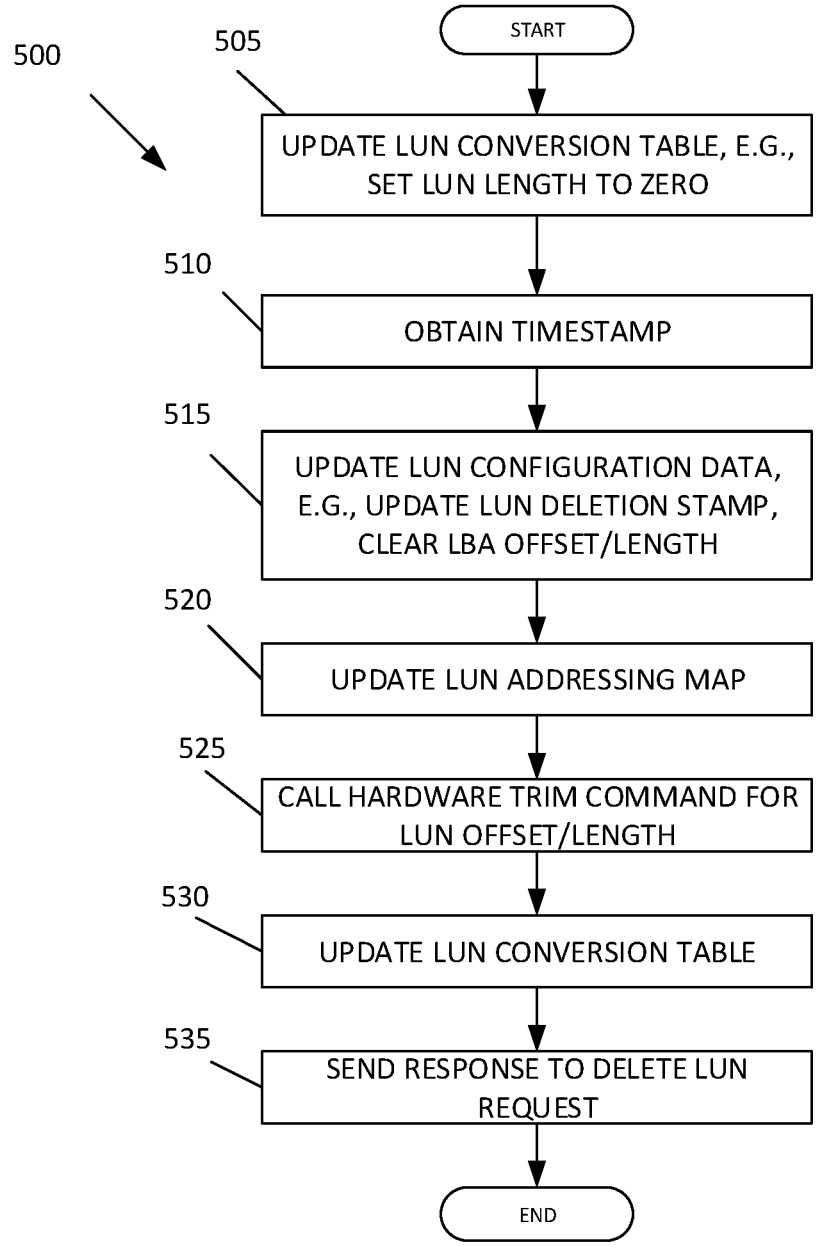
FIG. 5 is a flow chart of an embodiment of a method for deleting memory from host usage in, for example, the memory system of FIG. 2.

Referring now to FIG. 5, a flowchart illustrating an example method 500 of deleting a LUN and removing and/or freeing a range of LBAs from host control is disclosed. The flowcharts and block diagrams in the figures illustrate exemplary architecture, functionality, and operation of possible implementations of systems, methods, and computer program products according to various embodiments of the present invention. In this regard, each block in the flowchart or block diagram may represent a module, segment, or portion of instructions, which comprises one or more executable instructions for implementing the specified logical function(s). In some alternative implementations, the functions noted in the block may occur in a different order than noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The method 500 for deleting a LUN and/or removing a range of LBAs from Host control includes in one or more embodiments updating the LUN conversion table(s), e.g., LUN conversion Table 360, at 505. In an aspect, preferably the LUN conversion table 360 is updated to perform a deletion operation by setting the starting LBA to zero. Additionally or alternatively, a deletion operation at 505 updates the length or offset of the LUN to zero, and/or sets the number of LBAs to zero in the LUN conversion tables. In an embodiment, the logic handling the incoming requests from the Host and its associated conversions tables, e.g., LUN conversion Table 360A used by hardware SISLite engine, preferably should be updated before LUN conversion table 360B used by hardware Log 2Vir engine. In an example embodiment, the state of the LUN is set to an appropriate state, e.g., an invalid state. If the LUN conversion table(s) has a validity field, in one or more aspects the validity field can be set to indicate that the LBAs and LUN are not available or are invalid. The state could be set so that the LBAs within the LUN cannot be read.

At 510, a deletion timestamp can be obtained, preferably from hardware, for the LUN and associated LBAs being deleted. In an embodiment, a timestamp is obtained when the system undergoes a LUN deletion operation. At 515 the LUN configuration data, e.g., the LUN configuration data table 365, can be updated. The local LUN configuration data can be updated, and in one or more embodiments, the LUN configuration data can be updated persistently, e.g., in non-volatile memory. The LUN configuration data in an aspect is updated in the control store memory which can be accessed by firmware with less latency than data stored persistently in main memory, e.g., non-volatile memory. In an embodiment, the LUN configuration data can be updated by clearing, e.g., setting to zero, the LBA length (the number of LBAs), and/or the LUN length/offset. In an aspect, at 515, the timestamp is updated. In an aspect, the LUN timestamp obtained when the system undergoes a LUN deletion operation is saved in main memory. At 520, the LUN addressing map is updated. At 525, a hardware trim command for the LUN offset/length is performed. This trim hardware operation releases resources that were allocated to the LUN that is being deleted so those resources can be used for other LUNs in the system. In one or more embodiments, inactive VBAs are released by the hardware trim operation and added to the VBA Free List 340. The LUN conversion table, e.g., LUN conversion table 360B used by hardware Log 2Vir engine, in an embodiment is updated at 530 and in an aspect, the LUN offset and/or LBA length are set to zero. Earlier at 505, the logic handling the incoming requests from the Host and its associated conversions tables, e.g., LUN conversion Table 360A, were updated. At 530, preferably, the logic associated with the logical to virtual (L2V) translation engine and its associated conversion table, e.g., LUN conversion table 360B, is updated. Additionally or alternatively, a deletion operation at 530 updates the length/offset of the LUN to zero, and/or sets the number of LBAs to zero in the LUN conversion table 360B. A response is sent at 535 for the delete LUN request communicating that the request/command is completed.

While 505, 515, 520, and 530 have been addressed in a particular order for the sake of convenience it can be appreciated that the order can be changed, and in implementations 505, 515, 520 and 530 can occur simultaneously or nearly simultaneously, and in an embodiment conversion table 360A and 360B updates referred to at 505 and 530 can occur simultaneously or nearly simultaneously. Moreover, while the method 500 refers to updating the LUN configuration data, the LUN addressing map, and the LUN conversion tables, it can be appreciated that one or more of those actions might be optional in light of the memory and/or Host architecture and implementation.

One or more operations of the memory system, or memory management, include formatting a LUN and initializing the LBAs assigned to a LUN to a known state, e.g. set to zeros. In one or more embodiments, hardware state registers associated with the LUN are updated to manage memory accesses including incoming read/write operations during the format process, and to restore normal command flow following the format operation. The creation timestamp associated with the LUN is reset to indicate a new reference point, e.g., new creation timestamp, for LBAs assigned to the LUN. The new creation timestamp is updated in the LUN configuration data table(s) and is used to update the LUN conversion tables, LUN conversion table 360. A hardware trim command is invoked for the LUN offset/length (LBA range) associated with the LUN. This permits a format operation (with initialization to 0) to be performed quickly. The hardware trim frees appropriate VBAs from the L2VT table 370.

Figure 6:
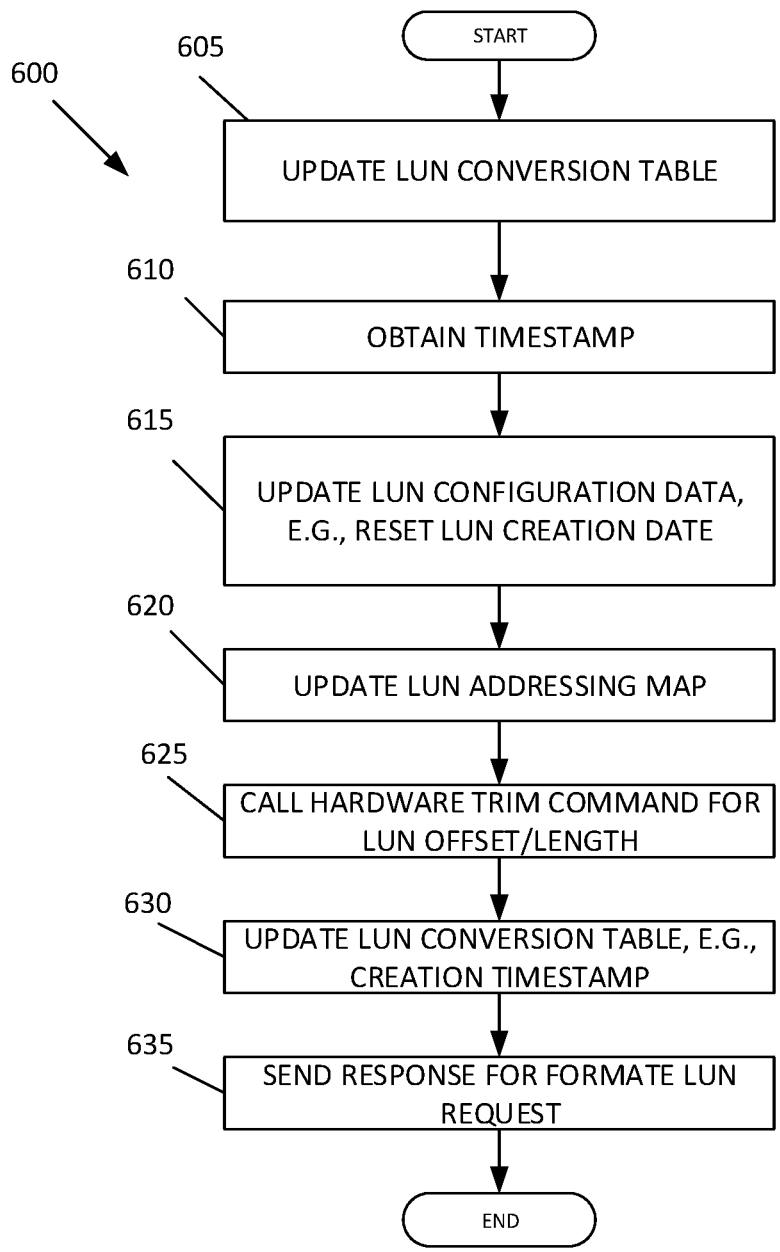
FIG. 6 is a flowchart illustrating an example method for formatting memory in, for example, the memory system of FIG. 2.

Referring to FIG. 6, a flowchart illustrating an example of formatting a LUN where the LBAs assigned to a LUN are initialized to a known state. Often a format operation is a quick operation to zero an entire range of assigned storage (range of LBAs) for a LUN. The format process may be run, for example, when storage is being allocated or deallocated. The flowcharts and block diagrams in the figures illustrate exemplary architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur in a different order than noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In the example formatting process 600 of FIG. 6, the LUN conversion table(s) is updated at 605, and in an aspect the LUN conversion table(s) is updated to change the state to indicate that a formatting is in progress. In an aspect, preferably the LUN conversion table 360 is updated to indicate that a formatting operation is in progress. In an embodiment, the logic handling the incoming requests from the Host and its associated conversions tables, e.g., LUN conversion Table 360A used by hardware SISLite engine, preferably should be updated before LUN conversion table 360B used by hardware Log 2Vir engine. A timestamp is obtained at 610, preferably from hardware. The LUN configuration data is updated at 615, which in one or more embodiments includes resetting the LUN creation timestamp by saving the obtained timestamp as the new creation timestamp. The LUN configuration data can be updated locally in the LUN configuration data (CD) table 365, and in the LUN configuration data (CD) table 365 saved at the memory module (media card 390), e.g., in non-volatile memory. The LUN address map is updated at 620, preferably in shared control store memory. At 625, a hardware trim command for the LUN offset/length is performed. This trim operation releases resources that were allocated to the LUN that is being deleted so those resources can be used for other LUNs in the system. For example, the hardware trim operation releases active VBAs and places them on the Free List 340.

The LUN conversion table, e.g., LUN conversion table 360B, in an embodiment is updated at 630, and in an aspect, is updated to reset the creation timestamp. Earlier at 605, the logic handling the incoming requests from the Host and its associated conversions tables, e.g., LUN conversion Table 360A, were updated. At 630, preferably the logic associated with the logical to virtual (L2V) translation engine and its associated conversion table, e.g., LUN conversion table 360B, is updated. In one or more embodiments, at 630, the state is reset in the LUN conversion table 360A to indicate that the LUN/LBA/memory locations corresponding to the conversion table entry are ready for input and/or output. (I/O). A response is sent at 635 to communicate completion of the format LUN command/request.

While 605, 615, 620, and 630 have been addressed in a particular order for the sake of convenience it can be appreciated that the order can be changed, and in implementations 605, 615, 620 and 630 can occur simultaneously or nearly simultaneously, and in an embodiment conversion table updates referred to at 605 and 630 can occur simultaneously or nearly simultaneously. Moreover, while the method 600 refers to updating the LUN configuration data, updating the LUN address map, updating the LUN conversion tables, and invoking the trim command, it can be appreciated that one or more of those actions might be optional in light of the memory architecture and/or Host implementation.

While the illustrative embodiments described above are preferably implemented in hardware, such as in units and circuitry of a processor, various aspects of the illustrative embodiments and/or techniques may be implemented in software as well. For example, it will be understood that each block of the flowchart illustrations in FIGS. 4-6, and combinations of blocks in the flowchart illustration, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustration support combinations of means for performing the specified functions, combinations of steps for performing the specified functions, and program instruction means for performing the specified functions. It will also be understood that each block of the flowchart illustration, and combinations of blocks in the flowchart illustration, can be implemented by special purpose hardware-based computer systems which perform the specified functions or steps, or by combinations of special purpose hardware and computer instructions.

Use of timestamps when provisioning, deleting, and formatting LUNs (LBAs) provides advantageous memory management features. The timestamps created and stored can be used to determine the relevancy of the data. For example, use of timestamps for the creation (including resetting of creation timestamp) and deleting of LUNs can advantageously be used to define the validity of all VBAs associated with a LBA. A timestamp is obtained when a new LUN is created, and reset as appropriate following operations such as Format Unit. The timestamps associated with the data (and stored in metadata) are updated as the data is written/updated. The creation and deletion timestamps can be used during the LVT rebuild process to determine whether VBAs are in use or whether they can be added to the VBA free list. During a LVT rebuild, which can be implemented during a power-up (and to a lesser extent power-down) procedure, timestamp comparisons can be performed to determine whether data is outdated and no longer in use so that the VBA can be added to the free list. Timestamps can also be used during maintenance operations to determine whether data is relevant or not, for example by performing a comparison of the creation and deletion timestamps with the timestamp of a triggering event, e.g., the event triggering the maintenance operation. For example, in one or more embodiments, during an LVT rebuild, the creation and/or deletion timestamp of the LUN associated with the LBA is compared with the timestamp obtained from metadata that is associated with the data when the data is written to memory. In an aspect, if the timestamp obtained from the metadata associated with the data when the data is written is older than the LUN creation timestamp (or the LUN creation timestamp is older than the LUN deletion timestamp) the VBA associated with that data can be added to the free list, as the LBA the data was associated with is not valid.

In addition to placing VBAs on a free list, the hardware (HW) trim command will mark LVT entries such that read operations directed at affected LBAs will return zeros until the entry in the LVT is written with data.

One or more embodiments of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

The corresponding structures, materials, acts, and equivalents of all means or step plus function elements in the claims below are intended to include any structure, material, or act for performing the function in combination with other claimed elements as specifically claimed. The description of the embodiments of the present disclosure has been presented for purposes of illustration and description, but is not intended to be exhaustive or limited to the embodiments in the form disclosed. Many modifications and variations will be apparent to those of ordinary skill in the art without departing from the scope and spirit of the disclosure. The embodiments and examples were chosen and described in order to best explain the principles of the disclosure and the practical application, and to enable others of ordinary skill in the art to understand the disclosure for various embodiments with various modifications as are suited to the particular use contemplated.

The programs described herein are identified based upon the application for which they are implemented in a specific embodiment of the disclosure. However, it should be appreciated that any particular program nomenclature herein is used merely for convenience, and thus the disclosure should not be limited to use solely in any specific application identified and/or implied by such nomenclature.

It will be clear that the various features of the foregoing systems and/or methodologies may be combined in any way, creating a plurality of combinations from the descriptions presented above.

It will be further appreciated that embodiments of the present disclosure may be provided in the form of a service deployed on behalf of a customer to offer service on demand.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of managing memory in a memory system, the method comprises:
   receiving a request for storage space in the memory system;
   obtaining a timestamp for a new Logical Unit Number (LUN):
   allocating a range of logical blocks to the new LUN in accordance with its requested size, the range of logical blocks including a starting logical block and a number of blocks;
   assigning the timestamp to the new LUN as a LUN creation timestamp;
   saving the LUN creation timestamp with other metadata identifying the new LUN and the allocated logical blocks;
   updating the state of a LUN to be formatted to indicate that the LUN is undergoing a formatting operation;
   obtaining a new timestamp for the LUN to be formatted;
   assigning the new timestamp for the LUN to be formatted as the LUN creation timestamp associated with the LUN to be formatted;
   saving the new timestamp as the LUN creation timestamp for the formatted LUN; and
   updating the state of the LUN being formatted to indicate that the LUN is ready to receive input/output.

2. The method of claim 1, wherein the range of logical blocks allocated to the new LUN are contiguous.

3. The method of claim 1, wherein new LUN configuration data including the LUN creation timestamp is saved in non-volatile memory in the memory system and further saved in volatile hardware conversion tables.

4. The method of claim 1, wherein the memory system comprises storage class memory having a plurality of storage chips having a plurality of dies having a plurality of non-volatile memory cells.

5. The method of claim 1, further comprising:
   associating in a logical to virtual translation table the assigned range of logical blocks to a corresponding set of virtual blocks in virtual memory; and
   associating the corresponding set of virtual blocks to corresponding physical storage space in the memory system.

6. The method of claim 1, further comprising assigning unique vital product data to the new LUN that can be retrieved by a Host.

7. The method of claim 1, further comprising performing a LUN deletion operation comprising:
   setting the range of logical blocks to zero for a LUN to be deleted;
   obtaining a timestamp for the LUN to be deleted;
   assigning the timestamp to the LUN to be deleted as a LUN deletion timestamp; and
   saving the LUN deletion timestamp for the LUN to be deleted.

8. The method of claim 7, wherein LUN configuration data for the LUN to be deleted, including the LUN deletion timestamp, is saved in non-volatile memory in the memory system.

9. The method of claim 7, further comprising:
   associating in a logical to virtual translation table the assigned range of logical blocks to a corresponding set of virtual blocks in virtual memory; and
   associating the corresponding set of virtual blocks to corresponding physical storage space in the memory system.

10. The method of claim 9, further comprising performing a trim process to remove active virtual blocks from use and placing them on a free list.

11. The method of claim 9, further comprising:
    performing a logical to virtual translation table rebuild process, and
    during the rebuild process, comparing a metadata timestamp saved with data when the data is written in main memory with at least one of the group consisting of the LUN creation timestamp, the LUN deletion timestamp, and both the LUN creation timestamp and the LUN deletion timestamp to determine which logical blocks are valid for the LUN.

12. The method of claim 1, further comprising performing a trim process to free active virtual blocks from use and placing them on a free list.

13. The method of claim 1, wherein LUN configuration data for the LUN that is formatted, including the LUN creation timestamp data, is saved in a data configuration table in main memory system, and further saved in one or more hardware conversion tables.

14. A memory system comprising:
a memory controller for managing memory storage;
a memory module having a plurality of packages, each package having a plurality of dies, each die containing a plurality of non-volatile memory cells; and
a computer-readable storage medium comprising program instructions that when executed in response to a request for storage space in the memory system cause the system to:
obtain a time stamp for a new Logical Unit Number (LUN);
allocate a range of logical blocks to the new LUN in accordance with its requested size, the range of logical blocks including a starting logical block and a number of blocks;
assign the timestamp to the new LUN as a LUN creation timestamp;
save the LUN creation timestamp with other metadata identifying the new LUN and the allocated logical blocks;
update the state of a LUN to be formatted to indicate that the LUN is undergoing a formatting operation;
obtain a new timestamp for the LUN to be formatted;
assign the new timestamp for the LUN to be formatted as the LUN creation timestamp associated with the LUN to be formatted;
save the new timestamp as the LUN creation timestamp for the formatted LUN; and
update the state of the LUN being formatted to indicate that the LUN is ready to receive input/output.

15. The system of claim 14, further comprising program instructions that when executed in response to a request to delete a LUN in the memory system cause the system to:
set the range of logical blocks to zero for a LUN to be deleted;
obtain a timestamp for the LUN to be deleted;
assign the timestamp to the LUN to be deleted as a LUN deletion timestamp; and
save the LUN deletion timestamp for the LUN to be deleted.

16. The system of claim 15, wherein new LUN configuration data including the LUN creation timestamp data and LUN deletion timestamp data is saved in the non-volatile memory cells, and further saved in volatile configuration data tables.

17. The system of claim 15, further comprising program instructions that when executed cause the system to:
associate in a logical to virtual translation table the assigned range of logical blocks to a corresponding set of virtual blocks in virtual memory;
associate the corresponding set of virtual blocks to corresponding physical storage space in the memory system; and
perform a trim process to free active virtual blocks from use and place them on a free list.

18. The system of claim 15, further comprising program instructions that when executed cause the system to:
perform a logical to virtual translation table rebuild process, and
during the rebuild process, compare a metadata timestamp saved with data in main memory with at least one of the group consisting of the creation timestamp, the deletion timestamp, and both the creation timestamp and the deletion timestamp to determine which range of logical blocks are valid for the LUN.

19. A memory system comprising:
a memory controller for managing memory storage;
a memory module having a plurality of packages, each package having a plurality of dies, each die containing a plurality of non-volatile memory cells; and
a computer-readable storage medium comprising:
program instructions that when executed in response to a request for storage space in the memory system cause the system to:
obtain a time stamp for a new Logical Unit Number (LUN);
allocate a range of logical blocks to the new LUN in accordance with its requested size, the range of logical blocks including a starting logical block and a number of blocks;
assign the timestamp to the new LUN as a LUN creation timestamp;
save the LUN creation timestamp with other metadata identifying the new LUN and the allocated logical blocks;
program instructions that when executed in response to a request to delete a LUN in the memory system cause the system to:
set the range of logical blocks to zero for a LUN to be deleted;
obtain a timestamp for the LUN to be deleted;
assign the timestamp to the LUN to be deleted as a LUN deletion timestamp; and
save the LUN deletion timestamp for the LUN to be deleted; and
program instructions that when executed cause the system to:
perform a logical to virtual translation table rebuild process, and
during the rebuild process, compare a metadata timestamp saved with data in main memory with at least one of the group consisting of the creation timestamp, the deletion timestamp, and both the creation timestamp and the deletion timestamp to determine which range of logical blocks are valid for the LUN.

20. The system of claim 19, further comprising program instructions that when executed cause the system to:
associate in a logical to virtual translation table the assigned range of logical blocks to a corresponding set of virtual blocks in virtual memory;
associate the corresponding set of virtual blocks to corresponding physical storage space in the memory system; and
perform a trim process to free active virtual blocks from use and place them on a free list.

* * * * *